United States Patent [19]

Labounty

[11] Patent Number: 5,531,007
[45] Date of Patent: Jul. 2, 1996

[54] SHEAR PROCESSOR FOR STEEL STRUCTURES

[75] Inventor: Roy E. Labounty, Two Harbors, Minn.

[73] Assignee: LaBounty Manufacturing, Inc., Two Harbors, Minn.

[21] Appl. No.: 448,228

[22] Filed: May 23, 1995

[51] Int. Cl.⁶ ................................................ B23P 19/00
[52] U.S. Cl. ........................................ 30/134; 241/101.73
[58] Field of Search .................... 30/134; 241/101.7, 241/101.73; 414/740

[56] References Cited

U.S. PATENT DOCUMENTS

| | | | |
|---|---|---|---|
| 4,198,747 | 4/1980 | LaBounty | 30/134 |
| 4,519,135 | 5/1985 | LaBounty | 30/134 |
| 4,543,719 | 10/1985 | Pardoe | 30/134 |
| 4,616,417 | 10/1986 | Gross | 30/134 |
| 4,670,983 | 6/1987 | Ramun et al. | 30/134 |
| 4,776,093 | 10/1988 | Gross | 30/134 |
| 4,872,264 | 10/1989 | LaBounty | 30/134 |
| 4,897,921 | 2/1990 | Ramun | 30/134 |
| 5,060,378 | 10/1991 | LaBounty et al. | 30/134 |
| 5,197,193 | 3/1993 | Smith | 30/134 |
| 5,224,268 | 7/1993 | Pemberton | 30/134 |
| 5,230,151 | 7/1993 | Kunzman et al. | 30/134 |

Primary Examiner—Douglas D. Watts
Attorney, Agent, or Firm—Pepe & Hazard

[57] ABSTRACT

A heavy duty cutting shear has first and second elongated jaws pivotably connected adjacent their inner ends for movement relative to each other between open and closed positions, and opposed working faces. The working face of the second jaw provides a recess into which the working face of the first jaw when the jaws are moved into the closed position. Each jaw has a pair of side cutting members extending along the sides of its working face and an end cutting member extending transversely of the side cutting members adjacent the jaw outer end. The side cutting members of the first jaw having inner and outer portions which intersect at an included angle of about 120°–160°.

17 Claims, 6 Drawing Sheets

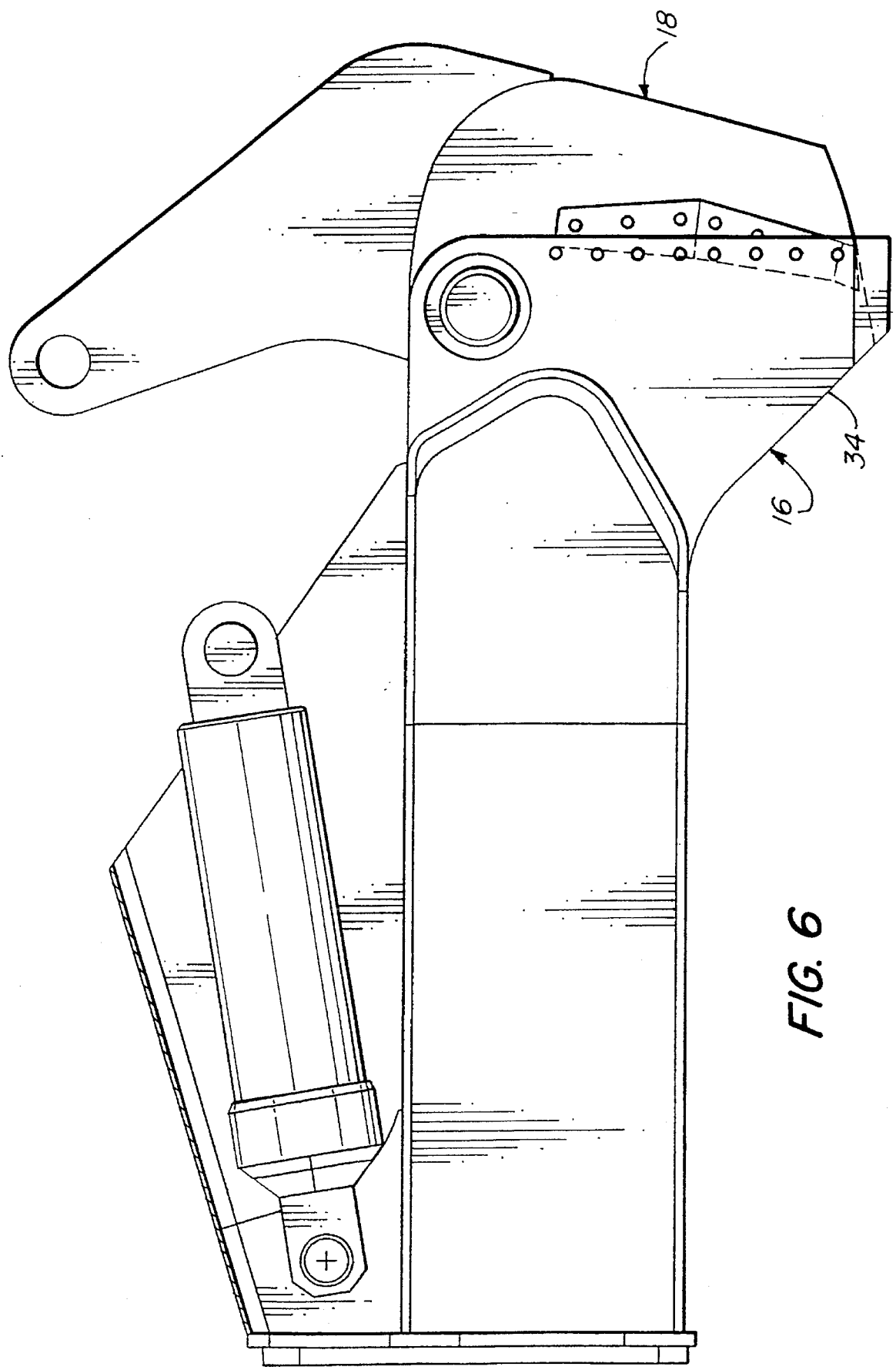

SHEAR PROCESSOR FOR STEEL STRUCTURES

BACKGROUND OF THE INVENTION

This invention relates to heavy-duty shears for attachment to the boom structure and hydraulic system of a backhoe or like apparatus and adapted to steel and other metallic structural elements including ships, storage tanks, beams and plate.

Heavy-duty shears are used for cutting into scrap for recycling, metal plates, storage tanks and a variety of structural metal members, such as I-beams, heavy steel pipes, and girders.

Exemplary of a heavy-duty shears designed specifically for cutting metal plates is Smith U.S. Pat. No. 5,197,193. This type of plate-cutting shear comprises an upper and a lower jaw with rectangularly arranged cutting edges, which enable the shear to produce a rectangular scrap coupon. The longitudinal cutting elements of the upper jaw are convexly configured so that their cutting edges maintain a constant cutting angle with respect to the cutting edges of the longitudinal cutting elements of the lower jaw which are rectilinear in configuration.

Although the Smith heavy-duty shears offers many advantages over prior art plate shearing devices, the convexly shaped cutting elements of the upper jaw tend to push the plate away from the closing jaws. This tendency to express the plate from the jaws may become a problem when movement of the plate is not a part of a larger, stationary structure undergoing demolition.

In addition, the convexly shaped cutting elements of The Smith upper jaw are ineffective for handling and processing structural members such as I-beams, heavy steel pipes, and girders. Instead of capturing these members the convexly configured upper jaw tends to express them from the jaws before they can be either grappled or sheared.

Unfortunately, limited purpose, heavy duty shears such as that of Smith are seldom versatile enough to handle effectively both plates and structural members, or to cut up efficiently both plates and structural members causing excess distortion of the cut pieces. Such distortion reduces the value of the scrap because it cannot be packed tightly enough to create a dense heavy load, and it needs to be mixed with denser material at the foundry. Since both plate and structural members are used extensively in large structures such as ships, storage tanks, offshore oil platforms, trailers and airplanes, there is a need for a multi-purpose, heavy duty shears which will effectively handle and efficiently cut both metal plates and structural metal members.

It is an object of the present invention to provide a novel multi-purpose, heavy duty shears for efficiently cutting both metal plates and structural members such as I-beams, pipes, and tanks.

It is also an object to provide such a heavy duty shears for effectively handling and manipulating both metal plates and structural members such as I-beams, and pipes.

Another object is to provide such a heavy duty shears which is readily attached to the boom structure and hydraulic system of a backhoe or similar apparatus for cutting steel or aluminum structures.

SUMMARY OF THE INVENTION

It has now been found that the foregoing and related objects may be readily attained in a heavy duty cutting shear comprising first and second elongated jaws pivotably connected adjacent their inner ends for movement relative to each other between open and closed positions. The jaws have opposed working faces with the working face of the second jaw providing a recess therein and the working face of the first jaw being dimensioned and configured cooperatively with the recess of the second jaw to enable the working face of the first jaw to move into the recess when the jaws are moved into the closed position. The working faces having sides and an outer end, and each jaw has a pair of transversely spaced, longitudinally extending side cutting members extending along the sides of the working faces, and the side cutting members of the first jaw having inner and outer portions which intersect at an angle. Each jaw also has an end cutting member extending transversely of the side cutting members adjacent the outer end of each of the jaws. The side and end cutting members of the jaws cooperate to provide a shearing action as the jaws are moved into the closed position.

Generally, the second jaw is a stationary lower jaw and includes a mounting portion for attachment to the boom structure of a backhoe or the like, and the first jaw is a movable upper jaw and includes means for attachment to the hydraulic system of the associated backhoe for moving the upper jaw relative to the lower jaw.

Desirably, the recess in the second jaw extends therethrough to provide a discharge opening in the second jaw to allow the severed section of a workpiece to exit therethrough when the jaws are closed and the workpiece is severed by the cutting members. Preferably, the second jaw includes spaced side members and an end member defining the opening.

The cutting members are removable blades, and the jaws include recesses for seating the blades, and means for removably securing blades in the recesses. These are conveniently threaded fasteners.

The blades are located on the outer side edges of the first jaw and frame the recess of the second jaw. The side cutting members of the first jaw are at different elevations, and the end cutting member of the first jaw extends at an angle between the side cutting members. The cutting members of the second jaw are blades with coplanar rectilinear shearing edges. The end cutting members extend perpendicularly to the side cutting members. The included angle between the inner and outer portions of the cutting member of the first jaw is 120°–160°.

BRIEF DESCRIPTION OF THE DRAWINGS

FIG. 6 is a similar view of the shears with the jaws in a fully closed position.

DETAILED DESCRIPTION OF THE PREFERRED EMBODIMENT

Figure 1:
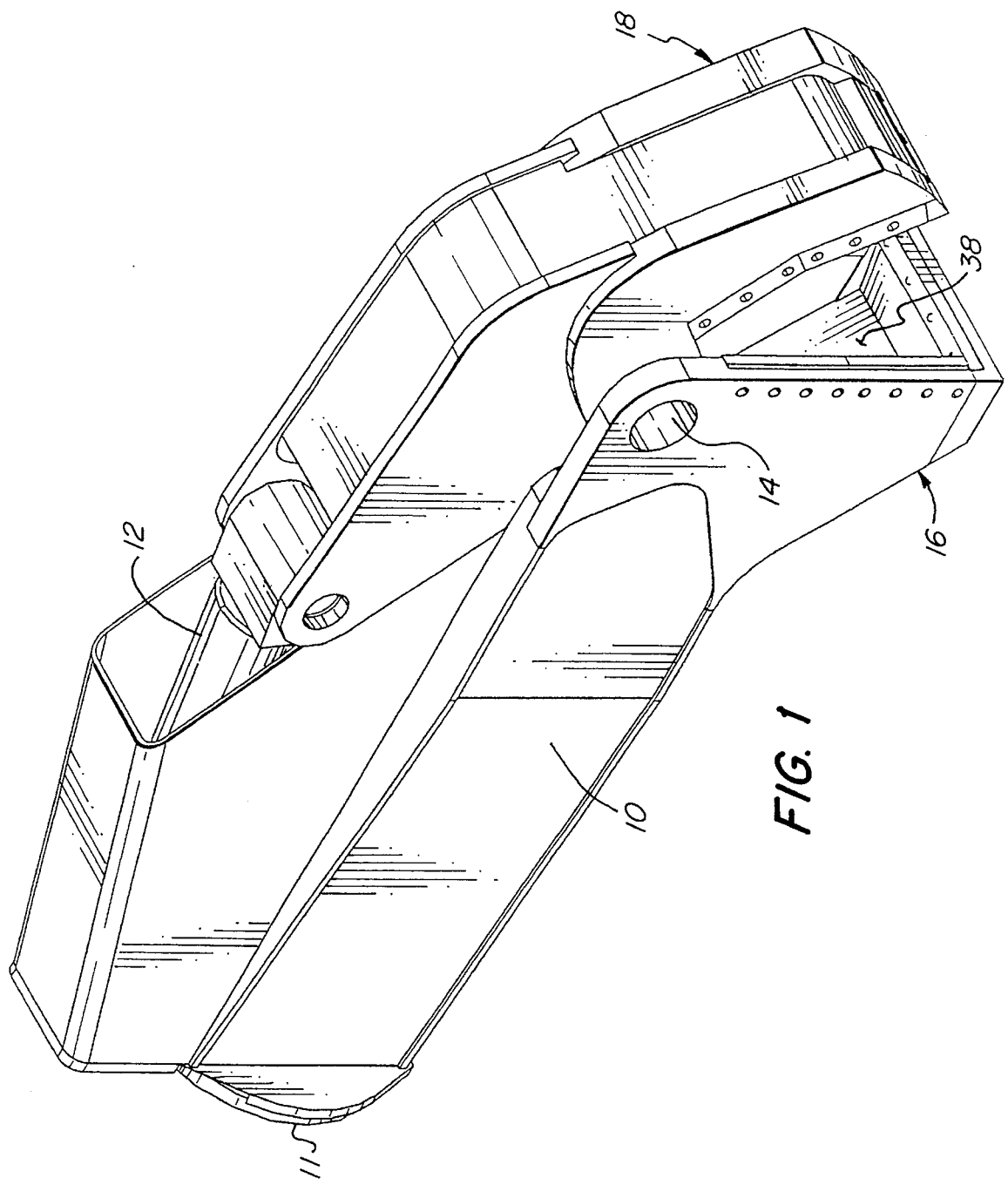
FIG. 1 is a top perspective view of the heavy duty shears embodying the present invention.
Figure 2:
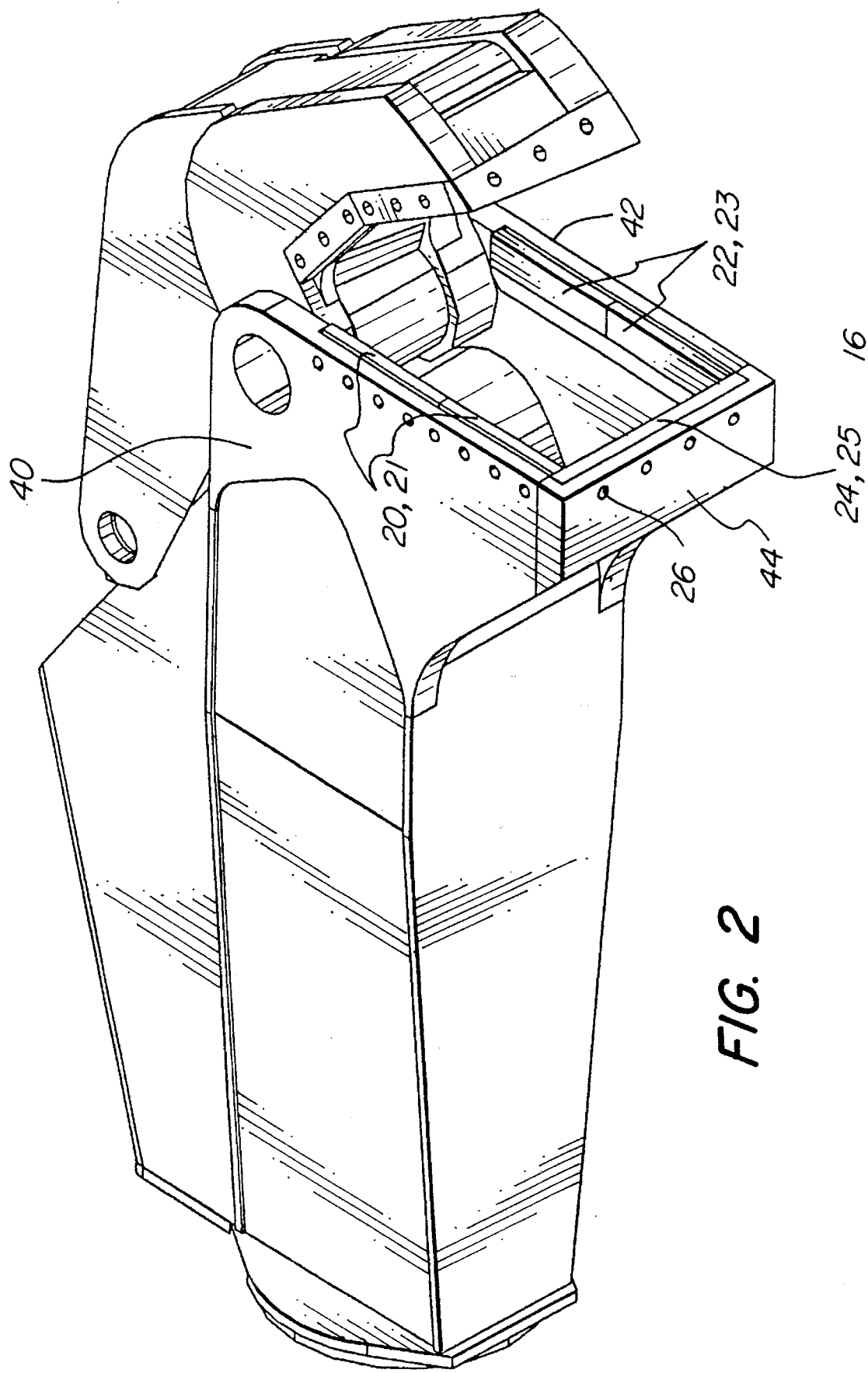
FIG. 2 is a bottom perspective view of the shears.

Turning first to FIGS. 1 and 2, therein illustrated is a heavy duty cutting shears embodying the present invention and comprised of a frame 10, a pivotable upper jaw generally designated by the numeral 18 and stationary lower jaw generally designated by the numeral 16. The frame 10 includes a mounting portion 11 which is connected to the boom of a hydraulic excavator (not shown). The stationary lower jaw 16 is secured to the frame 10, while the movable upper jaw 18 is pivotally coupled to the lower jaw 18 by a removable pivot pin 14 about which the movable upper jaw 18 pivots.

Figure 3:
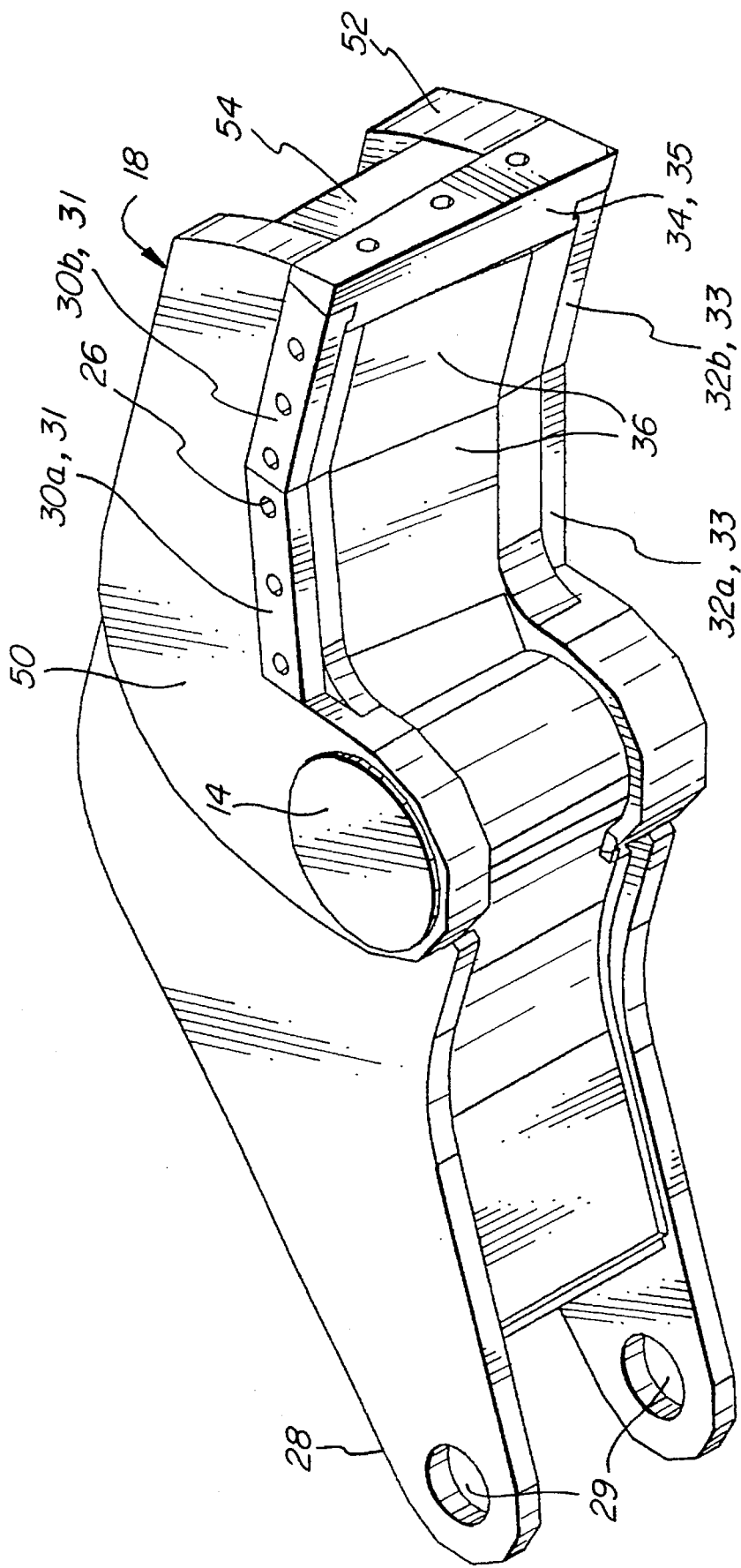
FIG. 3 is a bottom perspective view of the upper jaw of the shears drawn to an enlarged scale.
Figure 4:
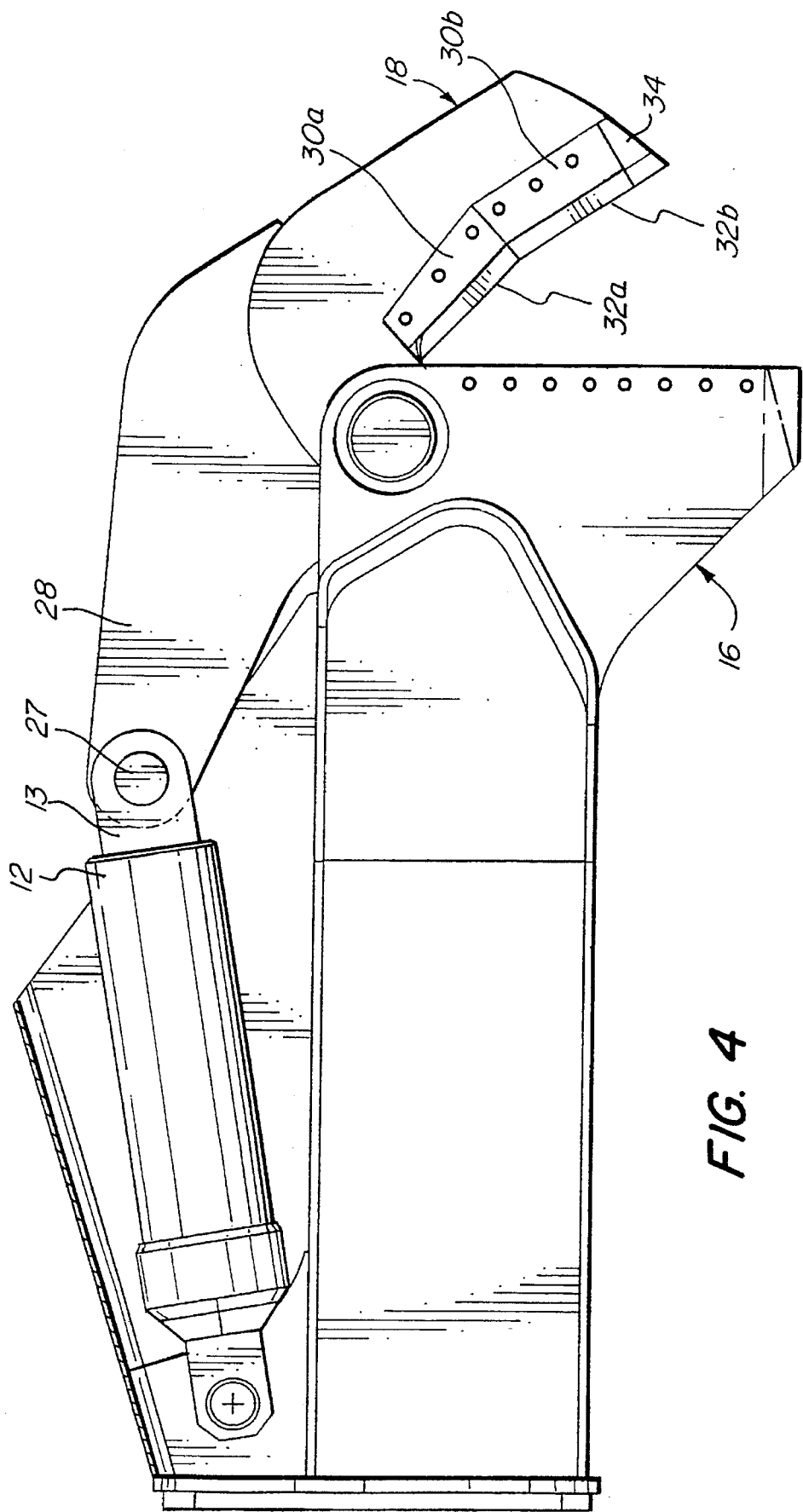
FIG. 4 is a side elevational view of hydraulic shears with the jaws in an open position.

The upper jaw 18 is operated by an extensible and retractable piston (not shown) of a hydraulic cylinder 12 to power its pivotable movement. As illustrated in FIG. 3, the connector portion 28 of the upper jaw 18 is bifurcated with two aligned apertures 29. As illustrated in FIG. 4, a pivot pin 27 seats within the apertures 29 and a thrust bearing 13 on the end of the piston of the hydraulic cylinder 12 to couple the upper jaw 18 and the piston of the hydraulic cylinder 12 and enable the jaw 18 to pivot relative thereto as to piston moves rectilinearly.

The upper jaw 18 is narrower in width and shorter in length than the lower jaw 16 to enable the upper jaw 18 to move into a recess or opening in the lower jaw 16 when they are closed upon each other during the shearing operation.

As best illustrated in FIG. 2, the lower jaw 16 has U-shaped working portion with side frame members 40 and 42, and a cross member 44 extending therebetween at its outer end to form three sides of a rectangle. On the upper ends and along the inner margins of the members 40–44 of the lower jaw 16 are cutting blades 20, 22 and 24 along the inner periphery of the lower jaw 16 which are provided by hardened steel insert bars 21, 23, 25 removable secured in recesses (not shown) in the members 40–44 by bolts 26. The cutting blades 20 and 22 extend rectilinearly along either side of the lower jaw 16 from adjacent its inner, pivoting end to its outer end. The cutting blade 24 adjacent the outer end of the lower jaw 16 extends transversely across the width of the lower jaw 16 between the cutting blades 20, 22.

The insert bars 21, 23, 25 all have flat top surfaces which are coplanar to facilitate the shearing of the metal plate workpieces. As seen in FIG. 2, the side frame members 40, 42 and cross member 44 provide a rectangular passage 38 through the lower jaw 18 which permits the downward discharge of severed pieces of the workpiece by gravity after they are sheared.

As seen in FIG. 3, the upper jaw 18 includes side frame members 50 and 52 which are joined together at their front end by the front frame member 54 to form three sides of a rectangle. Extending along the outer periphery of the frame members 50–54 of the upper jaw 18 are cutting blades 30, 32 and 34 which are defined by hardened steel insert bars 31, 33, 35 removably secured in recesses (not shown) of the frame members 50–54 by bolts 26. The cutting blades 30 and 32 lie in different planes, with the blade 32 extending below the blade 30. The blade 34 along the outer end of the upper jaw 18 extends transversely across the width of the upper jaw 18 at an angle between the blades 30, 32. Each of the blades 30, 32 is defined by two portions 30a, 30b and 32a, 32b which are angularly disposed so that they intersect at an obtuse angle of about 120°–160° to form an angled cutting edge along both the sides of the upper jaw 18, and these are vertically offset on the two sides of the jaw 18.

Figure 5:
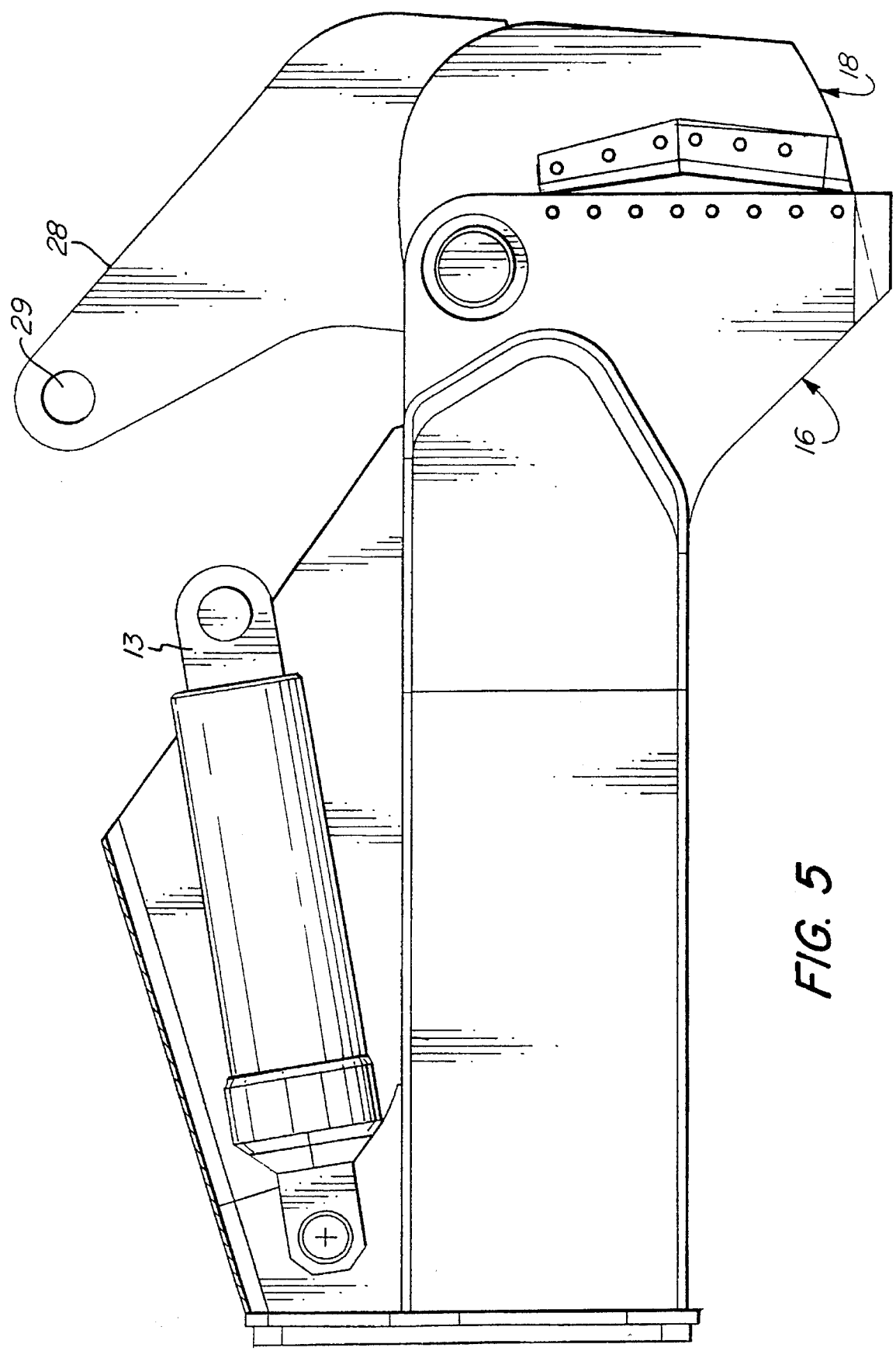
FIG. 5 is a similar view of the shears with the jaws in a partially closed position.

The angled cutting edge formed by cutting blades 30 and 32 allows structural workpieces such as I-beams, heavy steel pipes, and girders to be grappled within the jaws for handling, and forces the workpieces towards the apex of the angled cutting edges during shearing. The upper jaw 18 also effectively restrains plate workpieces during shearing, because the cutting blade 32 grips the plate during initial closing movement, and the front cutting blade 34 then grips the plate to keep the plate from being pushed outwardly between the jaws, as shown in FIG. 5. As the plate is sheared by the further closing movement, the downward angle of the forward blade 32 continues to provide a force acting inwardly on the plate towards the pivot of the jaws and towards the apex of the angled cutting edge during shearing. Thus, the plate is effectively restrained within the jaws throughout the entire shearing operation.

The angular orientation of the cutting blades 30, 32 and 34 allows them to shear a workpiece incrementally, requiring less force than if the blades 30, 32, 34 had no angle of attack and shearing took place simultaneously along the length of the blades 30, 32, 34.

Tie plates 36 extend across the width of the upper jaw 18 between the frame members 50, 52 to increase its structural integrity and help force sheared material through the opening 38 in the lower jaw 16.

In operation, the upper jaw 18 is swung towards the lower jaw 16 by extension of the piston of the hydraulic cylinder 12, as illustrated in FIGS. 4-6. While a structural member workpiece would be forced towards the apex of the cutting blades 30a, 30b, 32a, 32b of the upper jaw 18 during shearing, a plate member workpiece lies flat against the flat work engaging surface of the lower jaw 16. The innermost and outermost portions of the blades of the upper jaw 18 are the first to contact the work engaging surface of the lower jaw 16, as best illustrated in FIG. 5. As the jaws continue to close, shearing takes place along the shearing edges, with the last portion of the workpiece to be sheared located at the apices of the blades 30, 32 of the upper jaw 18. Once sheared, the workpiece is discharged through the opening 38 in the lower jaw 16.

The configuration of several components may vary from that which is illustrated in the accompanying drawings. For example, one or a plurality of cutting blades may comprise the angled cutting edges of the upper jaw. As an alternative to a pivotable upper jaw and a stationary lower jaw, both jaws may be pivotable.

Although various metals may be employed for the construction of the jaws, preferably at least the cutting edges of the blades are constructed of hardened steel for maximum resistance to abrasion and long life.

Thus, it can be seen from the foregoing detailed description and the attached drawings that the heavy duty cutting shears of the present invention effectively grapples and handles both metal plates and structural members such as I-beams, heavy steel pipes, and girders. Moreover, the heavy-duty shears effectively cuts both metal plates and structural members.

Having thus described the invention, what is claimed is:

1. A heavy duty cutting shear comprising (a) first and second elongated jaws pivotably connected adjacent their inner ends for movement relative to each other between open and closed positions, said jaws having opposed working faces with said working face of said second jaw providing a recess therein and said working face of said first jaw being dimensioned and configured cooperatively with said recess of said second jaw to enable said working face of said first jaw to move into said recess when said jaws are moved into said closed position, said working faces having sides and an outer end;

(b) a pair of transversely spaced longitudinally extending side cutting members extending along said sides of said working faces on each of said jaws, said side cutting members of said first jaw having inner and outer portions intersecting at an obtuse angle, said side cutting members on one side of said first jaw being at a different elevation than the side cutting members on the other side of said jaw; and (c) an end cutting member extending transversely of said side cutting members adjacent said outer end of each of said jaws, said end cutting member of said first jaw extending at an angle between said side cutting members on the opposite sides of said jaw, said side and end cutting members of each of said jaws providing a generally U-shaped configuration and cooperating to provide a shearing action as said jaws are moved into said closed position, said end cutting members cooperating to retain a workpiece between said jaws during the closing movement and the shearing action proceeding incrementally along the several cutting members during such movement.

2. The heavy duty cutting shear in accordance with claim 1 wherein said second jaw is a stationary lower jaw and includes a mounting portion for attachment to the boom structure of a construction vehicle, and said first jaw is a movable upper jaw including means for attachment to the hydraulic system of the associated construction shield for moving said upper jaw relative to said lower jaw.

3. The heavy duty cutting shear in accordance with claim 1 wherein said recess in said second jaw extends therethrough to provide a discharge opening in said second jaw to allow the severed section of a workpiece to exit therethrough when said jaws are closed and the workpiece is severed by said cutting members.

4. The heavy duty cutting shear in accordance with claim 3 wherein said second jaw includes spaced side members and an end member which frame said opening.

5. The heavy duty cutting shear in accordance with claim 1 wherein said cutting members are removable blades.

6. The heavy duty cutting shear in accordance with claim 1 wherein said jaws include recesses for seating said blades and wherein there is included means for removably securing said blades in said recesses.

7. The heavy duty cutting shear in accordance with claim 6 wherein securing means comprise threaded fasteners.

8. The heavy duty cutting shear in accordance with claim 6 wherein said blades are located along the outer edges of said first jaw and bound said recess of said second jaw.

9. The heavy duty cutting shear in accordance with claim 1 wherein said cutting members of said second jaw have coplanar rectilinear cutting edges.

10. The heavy duty cutting shear in accordance with claim 1 wherein said end cutting members extend perpendicularly to said side cutting members.

11. The heavy duty cutting shear in accordance with claim 1 wherein the included obtuse obtuse angle between said inner and outer portions is 120°–160°.

12. A heavy duty cutting shear comprising (a) first and second elongated jaws pivotably connected adjacent their inner ends for movement relative to each other between open and closed positions, and including a mounting portion for attachment to the boom structure of a backhoe or the line, said first jaw being a movable upper jaw and including means for attachment to the hydraulic system of the associated backhoe for moving said upper jaw relative to said lower jaw, said jaws having opposed working faces said second jaw having an opening extending therethrough and said working face of said first jaw being dimensioned and configured cooperatively with said opening of said second jaw to enable said working face of said first jaw to move into said opening when said jaws are moved into said closed position, said working faces having sides and an outer end;

(b) a pair of transversely spaced longitudinally extending side cutting members extending along said sides of said working faces on each of said jaws, said side cutting members of said first jaw having inner and outer portions intersecting at an obtuse angle, said side cutting members on one side of said first jaw being at a different elevation than the side cutting members on the other side of said jaw; and (c) an end cutting member extending transversely of said side cutting members adjacent said outer end of each of said jaws, said end cutting member of said first law extending at an angle between said side cutting members on the opposite sides of said jaw, said side and end cutting members of each of said jaws cooperating to provide a shearing action as said jaws are moved into said closed position whereby said opening provides a discharge opening in said second jaw to allow the severed section of a workpiece to exit therethrough when said jaws are closed and the workpiece is severed by said cutting members, said end cutting members cooperating to retain a workpiece between said jaws during the closing movement and the shearing action proceeding incrementally along the several cutting members during such movement.

13. The heavy duty cutting shear in accordance with claim 12 wherein said second jaw includes spaced side members and an end member which frame said opening.

14. The heavy duty cutting shear in accordance with claim 12 wherein said cutting members are removable blades, and said jaws include recesses for seating said blades and wherein there are included threaded fasteners for removably securing said blades in said recesses.

15. The heavy duty cutting shear in accordance with claim 14 wherein said blades are located along the outer edges of said first jaw and bound said recess of said second jaw.

16. The heavy duty cutting shear in accordance with claim 12 wherein said cutting members of said second jaw have coplanar rectilinear cutting edges, and said end cutting members extend perpendicularly to said side cutting members.

17. The heavy duty cutting shear in accordance with claim 11 wherein the included obtuse angle between said inner and outer portions is 120°–160°.

* * * * *

UNITED STATES PATENT AND TRADEMARK OFFICE
CERTIFICATE OF CORRECTION

PATENT NO. : 5,531,007
DATED : July 2, 1996
INVENTOR(S) : Roy E. LaBounty

It is certified that error appears in the above-indentified patent and that said Letters Patent is hereby corrected as shown below:

Column 5, line 24, delete "shield" and insert --vehicle--;
line 53, delete second "obtuse".

Signed and Sealed this

Twenty-sixth Day of November 1996

Attest:

BRUCE LEHMAN

*Attesting Officer*    Commissioner of Patents and Trademarks